United States Patent [19]

Skinner

[11] Patent Number: 4,850,445
[45] Date of Patent: Jul. 25, 1989

[54] SAFETY APPARATUS FOR MOTOR VEHICLES HAVING MODIFIED CONTROL SYSTEMS

[76] Inventor: James D. Skinner, 51 Shirley La., Edmond, Okla. 73034

[21] Appl. No.: 181,547

[22] Filed: Apr. 14, 1988

[51] Int. Cl.⁴ .............................................. B62D 25/20
[52] U.S. Cl. ..................... 180/90.6; 74/564; 180/287; 297/439; 297/466
[58] Field of Search .......... 180/90.6, 320, 333, 180/335, 287; 296/1 F; 297/439, 466; 74/564

[56] References Cited

U.S. PATENT DOCUMENTS

| | | | |
|---|---|---|---|
| 956,681 | 5/1910 | Clarke | 108/4 |
| 1,487,495 | 3/1924 | Von Germeten et al. | 296/75 |
| 1,554,969 | 9/1925 | Henke | 180/90.6 |
| 1,981,148 | 11/1934 | Muench | 74/564 |
| 2,136,980 | 11/1938 | Pim | 180/90.6 |
| 2,283,600 | 5/1942 | Dodson | 280/727 |
| 2,341,080 | 2/1944 | Burkholder | 297/439 |
| 2,407,646 | 9/1946 | Best | 297/466 |
| 2,994,365 | 8/1961 | Ziegler | 297/439 |
| 3,047,088 | 7/1962 | Murrell | 180/90.6 |
| 3,367,327 | 2/1968 | Rybcynski | 297/466 |
| 3,785,702 | 1/1974 | Buehring | 297/439 |
| 3,860,284 | 1/1975 | Lichtig | 296/75 |
| 4,004,583 | 1/1977 | Johnson | 297/466 |
| 4,192,546 | 3/1980 | Smith | 297/466 |
| 4,476,954 | 10/1984 | Johnson et al. | 180/333 |
| 4,632,209 | 12/1986 | Russell | 180/287 |

FOREIGN PATENT DOCUMENTS

| | | | |
|---|---|---|---|
| 634937 | 1/1962 | Canada | 180/90.6 |
| 273938 | 5/1914 | Fed. Rep. of Germany | 297/439 |
| 233553 | 5/1925 | United Kingdom | 74/564 |

Primary Examiner—Kenneth R. Rice
Attorney, Agent, or Firm—Laney, Dougherty, Hessin & Beavers

[57] ABSTRACT

Safety apparatus for preventing a physically handicapped driver of a motor vehicle from unintentionally contacting a first foot control pedal of the vehicle with his or her lower limb when he or she operates the vehicle without using the first foot control panel are provided. The apparatus include a base member adapted to be attached to the floorboard of the vehicle adjacent the first foot control pedal thereof. The base member includes means for holding the lower limb of the driver away from the first foot control pedal. Also provided is a motor vehicle having a first foot control pedal for controlling a first function of the vehicle, an alternative control mechanism for allowing a physically handicapped driver to control the first function of the vehicle without using the first foot control pedal and safety apparatus for preventing the handicapped driver from unintentionally contacting the first foot control pedal with his or her lower limb when he or she controls the first function of the vehicle with the alternative control mechanism.

17 Claims, 2 Drawing Sheets

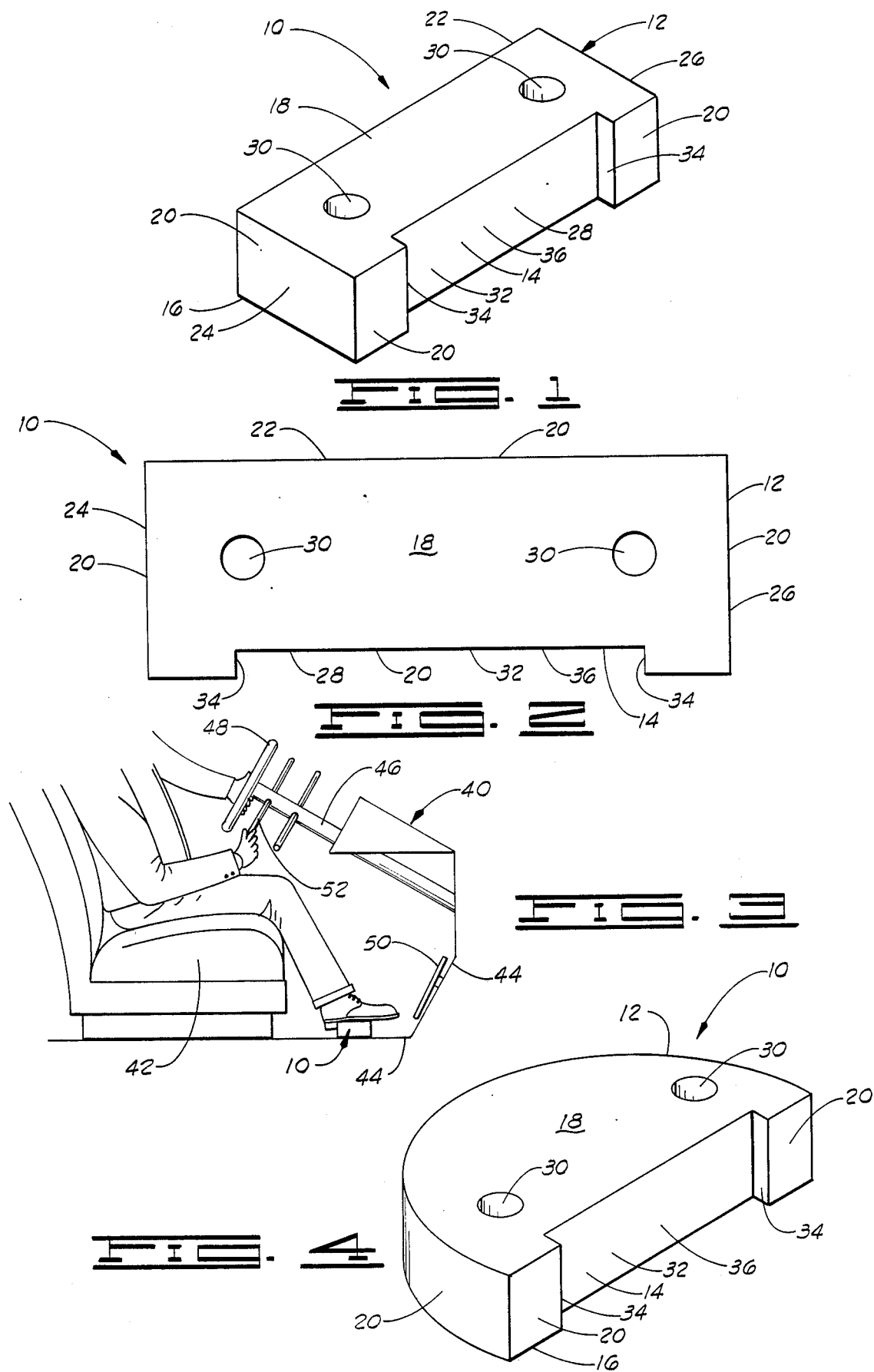

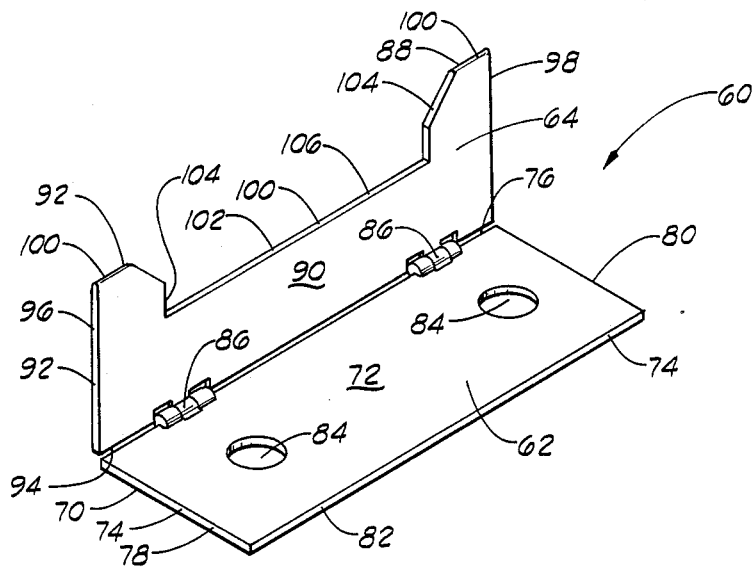
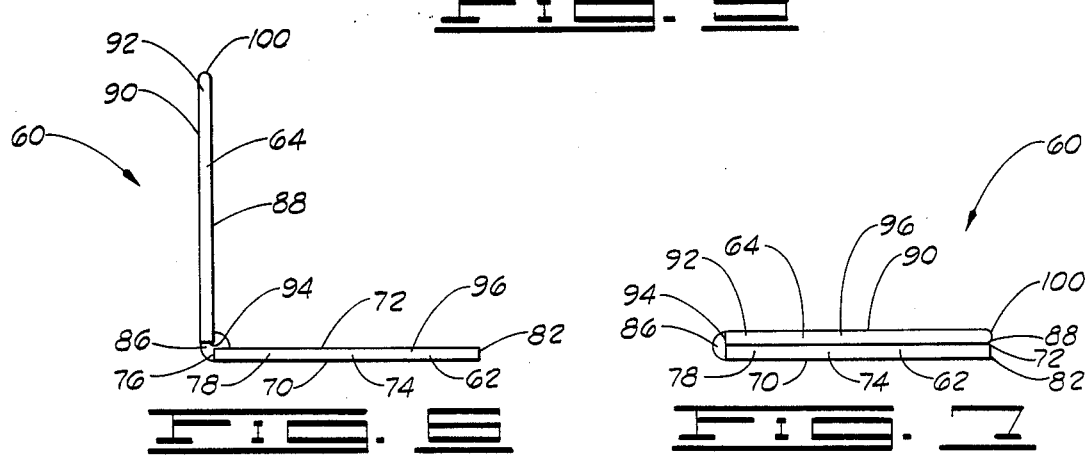
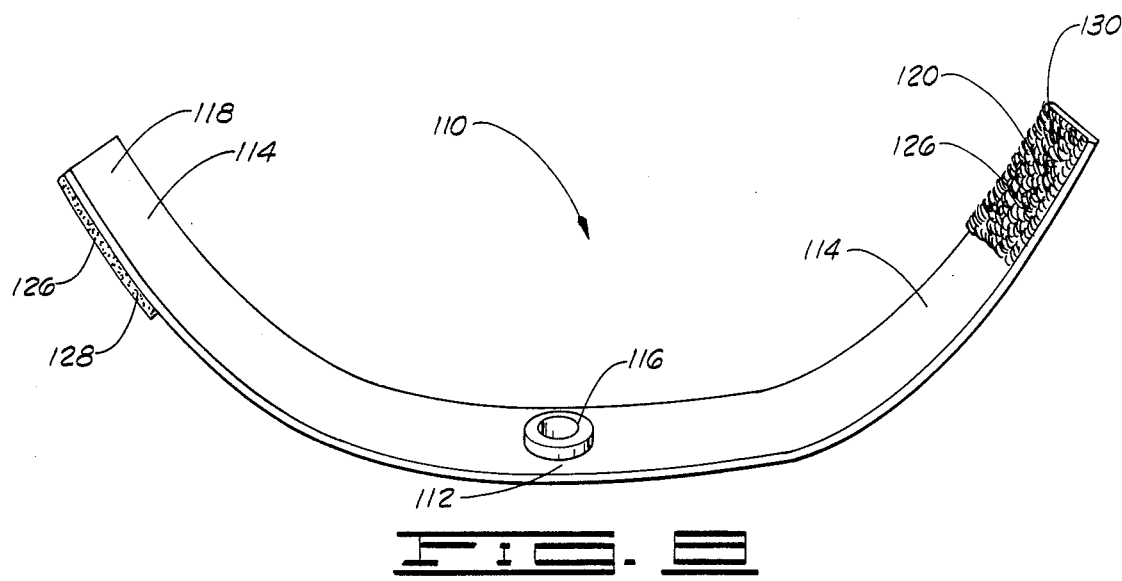

SAFETY APPARATUS FOR MOTOR VEHICLES HAVING MODIFIED CONTROL SYSTEMS

BACKGROUND OF THE INVENTION

1. Field of the Invention

The present invention relates generally to motor vehicles having alternative control mechanisms for drivers that have restricted use of their lower limbs, and more particularly, but not by way of limitation, to safety apparatus for motor vehicles having both standard foot operated control pedals for able drivers and alternative control mechanisms for drivers that have restricted use of their lower limbs.

2. Description of the Prior Art

Although many steps have been taken to make it easier for physically handicapped individuals to get around, most motor vehicles are designed to be operated only by individuals that have unrestricted use of their lower limbs. Present motor vehicles designed for individuals that have unrestricted use of their lower limbs include a rotary operating steering wheel and standard foot control pedals such as a brake pedal and a right foot operated acceleration pedal. Individuals having restricted use of their right leg and/or foot or restricted use of all of their lower limbs cannot safely operate motor vehicles having only the standard foot control pedals.

In order to accommodate drivers that have restricted use of their lower limbs, many motor vehicles have been modified to include alternative control mechanisms. For drivers having restricted use of their right leg and/or foot, some motor vehicles have been modified to include an acceleration pedal positioned for operation by the left foot of the driver. For drivers having restricted use of all of their lower limbs, other motor vehicles have been modified to include steering column control levers or other control mechanisms that can be operated by hand.

When a motor vehicle is modified to include alternative control mechanisms, the standard foot control pedals are often left in place so that the vehicle can be operated in the normal fashion by drivers that have unrestricted use of their lower limbs. This decreases the cost of the initial modification and makes it easier to sell the vehicle at a later time. For some drivers, however, leaving the standard foot control pedals in place can cause serious problems. For example, if a handicapped driver has a muscle spasm or otherwise loses control of his or her right leg and/or foot, he or she may not be able to prevent his or her right leg and/or foot from contacting the standard acceleration pedal. Even though the driver can control the vehicle with the alternative control mechanisms, contact with the standard acceleration pedal during operation of the vehicle can result in a serious accident.

By the present invention, apparatus for preventing a physically handicapped driver of a motor vehicle that includes both standard foot operated control pedals and alternative control mechanisms from contacting one or more of the standard foot operated control pedals of the vehicle with one or more of his or her lower limbs when operating the vehicle with the alternative control mechanisms are provided.

SUMMARY OF THE INVENTION

In a first aspect, the present invention provides safety apparatus for preventing a physically handicapped driver of a motor vehicle from unintentionally contacting a first foot control pedal of the vehicle with his or her lower limb when he or she operates the vehicle without using the first foot control pedal. The apparatus comprises a base member adapted to be attached to the floorboard of the vehicle adjacent the first foot control pedal. The base member includes means for holding the lower limb of the driver away from the first foot control pedal.

In a second aspect, the present invention provides a motor vehicle comprising a first foot control pedal for controlling a first function of the vehicle, alternative control means for allowing a physically handicapped driver to control the first function of the vehicle without using the first foot control pedal and safety apparatus for preventing the driver from unintentionally contacting the first foot control pedal with his or her lower limb when he or she controls the first function of the vehicle with the alternative control means. The safety apparatus comprises a base member attached to the floorboard of the vehicle adjacent the first foot control pedal. The base member includes means for holding the lower limb of the driver away from the first foot control pedal.

The safety apparatus of both aspects of the present invention is the same. In a first embodiment of the apparatus, the base member comprises a block having a lower surface, an upper surface and a side surface connecting the lower surface and the upper surface together, the side surface including a front portion that faces away from the first foot control pedal when the block is attached to the floorboard of the vehicle. The means for holding the lower limb of the driver away from the first foot control pedal comprises the front surface.

In a second embodiment of the apparatus, the base member comprises a first plate, the first plate having a lower surface, an upper surface and a side surface connecting the lower surface and the upper surface together. The means for holding the lower limb of the driver away from the first foot control pedal comprises a second plate pivotally attached to the first plate and perpendicularly extending therefrom, the second plate having a lower surface, an upper surface and a side surface connecting the lower surface and the upper surface together. The second plate can be moved or folded toward the first plate such that the lower surface of the second plate faces the upper surface of the first plate thereby preventing the second plate from interfering with normal use of the first foot control pedal by an able driver.

In a third embodiment of the apparatus, the base member comprises a center member. The means for holding the lower limb of the driver away from the first foot control pedal comprises two flexible end members attached to the center member and extending outwardly therefrom and means for attaching the end members together.

It is, therefore, a general object of the present invention to provide a motor vehicle that can be safely and reliably operated by drivers having restricted use of one or more of their lower limbs.

It is an object of the present invention to provide safety apparatus for preventing a physically handicapped driver of a motor vehicle from unintentionally contacting a first foot control pedal of the vehicle with his or her lower limb when he or she operates the vehicle without using the first foot control pedal.

It is an object of the present invention to provide safety apparatus that can be inexpensively manufactured and easily installed in motor vehicles.

Additional objects, features and advantages of the present invention will be readily apparent to those skilled in the art from a reading of the following description of the preferred embodiments when taken in conjunction with the accompanying drawings.

BRIEF DESCRIPTION OF THE DRAWINGS

FIG. 1 is a perspective view of one form of a first embodiment of the safety apparatus of the present invention.

FIG. 2 is a top view of the embodiment of the safety apparatus illustrated in FIG. 1.

FIG. 3 is a side view of the embodiment of the safety apparatus illustrated in FIGS. 1 and 2 as installed in a motor vehicle and used..

FIG. 4 is a perspective view of another form of the first embodiment of the safety apparatus of the present invention.

FIG. 5 is a perspective view of a second embodiment of the safety apparatus of the present invention.

FIG. 6 is a side view of the safety apparatus illustrated in FIG. 5 as positioned in an operational position.

FIG. 7 is a side view of the safety apparatus illustrated in FIG. 5 as positioned in a non-operational position.

FIG. 8 is a perspective view of a third embodiment of the safety apparatus of the present invention.

DESCRIPTION OF THE PREFERRED EMBODIMENTS

In a first aspect, the present invention provides safety apparatus for preventing a physically handicapped driver of a motor vehicle from unintentionally contacting a first foot control pedal of the vehicle with his or her lower limb when he or she operates the vehicle without using the first foot control pedal. In a second aspect, the present invention provides a motor vehicle comprising a first foot control pedal for controlling a first function of the vehicle, alternative control means for allowing a physically handicapped driver to control the first function of the vehicle without using the first foot control pedal and safety apparatus for preventing the driver from unintentionally contacting the first foot control pedal with his or he lower limb when he or she controls the first function of the vehicle with the alternative control means.

The safety apparatus of both aspects of the present invention comprise a base member adapted to be attached or attached to the floorboard of the vehicle adjacent the first foot control pedal thereof, the base member including means for holding the lower limb of the driver away from the first foot control pedal. The base member of the safety apparatus of the first aspect of the present invention is adapted to be attached to the floorboard of the vehicle whereas the base member of the safety apparatus of the second aspect of the present invention is attached to the floorboard of the vehicle. Other than this difference, the safety apparatus of both aspects of the present invention are the same and will not be described separately below.

Although the safety apparatus can be used to prevent unintentional contact with any of the foot control pedals commonly employed in a motor vehicle, it is particularly useful for preventing unintentional contact with the standard acceleration pedal of the vehicle.

As used herein and in the appended claims, the first foot control pedal refers to any one of the standard foot control pedals. The lower limb of the driver refers to the driver's right or left leg, ankle and/or foot, including a shoe or other item of clothing or equipment attached thereto.

Referring now to the drawings, and particularly to FIGS. 1 and 2, a first embodiment of the safety apparatus of the present invention is illustrated and generally designated by the numeral 10. The apparatus 10 comprises a base member 12 adapted to be attached to the floorboard of a motor vehicle adjacent a first foot control pedal thereof. The base member 12 includes means 14 for holding the lower limb of the driver away from the first foot control pedal.

In this embodiment, the base member 12 is in the form of a block having a lower surface 16, an upper surface 18 and a side surface 20 connecting the lower surface and the upper surface together. The side surface 20 includes a rear surface 22, an end surface 24, an end surface 26 and a front surface 28. A pair of openings 30 extend through the upper surface 18 and lower surface 16 of the block 12. The openings 30 are adapted to receive a pair of bolts or other fastening means (not shown) for attaching the block 12 to the floorboard of the vehicle.

The means 14 for holding the lower limb of the driver away from the first foot control pedal comprise the front surface 28 of the side surface 20 of the base member 12. The front surface 28 has a notch 32 defined therein for receiving a portion of the lower limb of the driver. The notch 32 comprises two end surfaces 34 extending from the lower surface 16 of the block 12 to the upper surface 18 of the block and a bottom surface 36 connecting the end surfaces together. The notch 32 allows the apparatus 10 to effectively hold the lower limb of the driver away from the first foot control pedal. For example, if the driver wears a shoe having a heel on his or her lower limb, the notch 32 effectively receives and holds the heel portion of the shoe.

Referring now to FIG. 3, a motor vehicle having the safety apparatus 10 installed therein is illustrated. A motor vehicle 40 includes a front seat 42, a floorboard 44, a steering column 46 and a rotary operating steering wheel 48. A standard acceleration pedal 50 is attached to the floorboard 44 of the motor vehicle 40. The standard acceleration pedal 50 controls the amount of fuel provided to the motor of the motor vehicle 40. Alternative control means 52 for controlling the amount of fuel provided to the motor with the motor vehicle 40 are disposed on the steering column 46. As shown in FIG. 3, the alternative control means 52 comprise a hand operated throttle. The hand operated throttle 52 allows a physically handicapped driver to control the amount of fuel provided to the motor of the motor vehicle 40 without using the acceleration pedal 50. Inasmuch as the hand operated throttle 52 is disposed on the steering column 46, it can be easily reached by the driver. For drivers having restricted use of only their right foot and/or leg, the alternative control means 52 can comprise an acceleration pedal positioned for operation by the left foot of the driver. Other alternative control means can be used as well.

The safety apparatus 10 of the present invention is bolted to the floorboard 44, preferably 3 to 6 inches in front of the acceleration pedal 50. The safety apparatus 10 is attached to the floorboard 44 by extending a pair of bolts (not shown) through the openings 30 disposed in the block 12 and the floorboard and tightening a pair of lock nuts (not shown) on the ends of the bolts. The safety apparatus 10 is positioned on the floorboard such that the front surface 28 of the side surface 20 of the block 12 faces away from the acceleration pedal 50. When operating the motor vehicle 40 by using alternative control means, the driver places his foot either between the front seat 42 and the safety apparatus 10 or on the safety apparatus 10 with the heel of his or her shoe extending into the notch 32. The end surfaces 34 of the notch prevent the driver's foot and/or shoe from laterally sliding off the apparatus 10. The safety apparatus 10 holds the foot and entire lower limb of the driver away from the standard acceleration pedal 50 and thereby prevents the driver from unintentionally contacting the standard acceleration pedal with his or her lower limb when he or she controls the vehicle with the alternative control means.

Instead of using bolts, the safety apparatus 10 can be attached to the floorboard 44 of the motor vehicle 40 with thumb screws or other similar fastening means in order to allow the apparatus to be quickly and easily installed or removed as needed. The block 12 should be of a size sufficient to hold the lower limb of the driver away from the standard acceleration pedal 50. More than one block can be used.

The block 12 can be formed in a variety of shapes. FIG. 4 illustrates a block 12 having the shape of a half-circle. The size and the shape of the block 12 can vary depending upon the particular motor vehicle and foot control pedal(s) involved.

The block 12 can be made of wood, metal, plastic, rubber or any other material. If made of wood, metal or hard plastic, a rubber pad can be attached to the surfaces of the apparatus 10 to protect the shoe and/or foot of the driver and prevent it from slipping off the block. If made of plastic or rubber, the block 12 should be capable of withstanding a temperature of at least 150° F.

Referring now to FIGS. 5–7, a second embodiment of the safety apparatus of the present invention is illustrated and generally designated by the numeral 60. The apparatus 60 comprises a base member 62 adapted to be attached to the floorboard of a vehicle adjacent a first foot control pedal thereof. The base member 62 includes means 64 for holding the lower limb of the driver away from the first foot control pedal.

In this embodiment, the base member 62 is in the form of a first plate having a lower surface 70, an upper surface 72 and a side surface 74 connecting the lower surface and upper surface together. The side surface 74 comprises a rear surface 76, an end surface 78, an end surface 80 and a front surface 82. A pair of openings 84 extend through the upper surface 72 and lower surface 70 of the first plate 62. The openings 84 are adapted to receive a pair of bolts for attaching the first plate 62 to the floorboard of a vehicle. The first plate 62 is attached to the floorboard of the vehicle in the same way that the block 12 of the first embodiment is attached thereto. It is preferably attached to the floorboard of the vehicle 3 to 6 inches in front of the first foot control pedal thereof.

The means 64 for holding the lower limb of the driver away from the first foot control pedal comprise a second plate pivotally attached to the first plate 62 by a pair of hinges 86. The second plate 64 comprises a lower surface 88, an upper surface 90 and a side surface 92 connecting the lower surface and the upper surface together. The side surface 92 comprises a rear surface 94, an end surface 96, an end surface 98 and a front surface 100.

The front surface 100 of the surface 92 of the second plate 64 has a notch 102 defined therein for receiving a portion of the lower limb of the driver. The notch 102 comprises two end surfaces 104 extending from the lower surface 88 of the second plate 64 to the upper surface 90 of the second plate and a bottom surface 106 connecting the end surfaces together. The notch 102 allows the apparatus 60 to effectively receive and hold the lower limb of the driver away from the first foot control pedal. The notch 102 effectively receives and holds the heel of a shoe worn by the driver.

The end surfaces 96 and 98 and front surface 100 of the side surface 92 of the second plate 64 are of a width sufficient to prevent the second plate from scuffing the shoe or causing injury to the lower limb of the driver. The notch 102 is formed in the front surface 100 such that the front surface 100 does not have any sharp ends or points.

The second plate 64 holds the lower limb of the driver away from the first foot control pedal by blocking access to the first foot control pedal. When operating the motor vehicle by using the alternative control means, the driver places his foot either between the front seat of the vehicle and the safety apparatus 60 or in the notch 102 of the front surface 100 of the side surface 92 of the second plate 68 of the apparatus. The end surfaces 104 of the notch 102 prevent the driver's foot and/or shoe from laterally sliding off the apparatus 60.

The second plate 64 can be moved or folded down toward the first plate 62 such that the lower surface 88 of the second plate faces the upper surface 72 of the first plate. This allows the first foot control pedal to be operated in a normal fashion when the alternative control means are not used. In FIG. 6, the second plate 64 is shown in an operational position. In this position, it extends approximately perpendicularly from the first plate 62. The second plate 64 is shown in a non-operational position in FIG. 7. In this position, it is folded down on top of the first plate 62.

The hinges 86 hold the second plate 64 firmly in its operational position. Preferably, the hinges 86 only allow the second plate 64 to be folded downwardly on top of the first plate 62. Alternatively, the hinges 86 can be of a structure that permits the second plate 64 to be folded down in either direction, i.e., either on top of the first plate 62 or towards the first foot control pedal on top of the floorboard of the vehicle. Although hinges are preferred, any means for pivotally attaching the second plate 64 to the first plate 62 can be used.

Like the block 12 of the first embodiment, the first plate 62 and second plate 64 can be formed in a variety of shapes and sizes. The plates can be formed of wood, metal, plastic or any other type of material. Rubber padding can be attached to the second plate 64 to protect the shoe and/or foot of the driver and to prevent the shoe and/or foot from slipping therefrom.

Referring now to FIG. 8, a third embodiment of the safety apparatus of the present invention is illustrated and generally designated by the numeral 110. The apparatus 110 comprises a base member 112 adapted to be attached to the floorboard of a motor vehicle adjacent a first foot control pedal thereof. The base member 112 includes means 114 for holding the lower limb of the driver away from the first foot control pedal of the vehicle.

In this embodiment, the base member 112 comprises a center member. A metal or plastic grommet 116 preferably extends through the center member 112. The grommet 116 is adapted to receive a bolt (not shown) for attaching the center member 112 to the floorboard of the vehicle. The center member 112 is attached to the floorboard of the vehicle in the same way that the block 12 of the first embodiment of the present invention and the first plate 62 of the second embodiment of the present invention are attached thereto.

The means 114 for holding the lower limb of the driver away from the first foot control pedal comprise two flexible end members 118 and 120, each attached to the center member 112 and extending outwardly therefrom, and means 126 for attaching the end members 118 and 120 together. End members 118 and 120 can be wrapped around the leg, ankle and/or foot of the driver and attached together to hold the lower limb of the driver away from the first foot control pedal. When attached to the center member 112, the end members 118 and 120 form a strap. The end members 118 and 120 can be formed separately and attached to the center member 112, or the end members 118 and 120 can be formed together with the center member 112 to form a one-piece member.

The means 126 for attaching the end members 118 and 120 together preferably comprises "Velcro". "Velcro" is the trademark for a particular type of fastener made by American Velcro Company. First and second "Velcro" layers 128 and 130 are attached to the end member 118 and end member 120, respectively. The first and second "Velcro" layers 128 and 130 stick together upon contact. Alternatively, the means 126 for attaching the end members 118 and 120 together can comprise a buckle. Other means for attaching the end members 118 and 120 together can be utilized as well.

The center member 112 and end members 118 and 120 can be formed of any type of material. The end members 118 and 120 need to be flexible so that they can be wrapped around the leg, ankle and/or foot of the driver of the motor vehicle. The center member 112 should be attached to the floorboard of the vehicle in a position such that the end members 118 and 120 can be wrapped around the leg, ankle and/or foot of the driver of the motor vehicle and hold the lower limb of the driver away from the first foot control pedal when the driver is positioned in the front seat thereof.

From the above, it can be seen that the safety apparatus of the present invention can be effectively utilized to prevent a physically handicapped driver of a motor vehicle from unintentionally contacting a first foot control pedal of the motor vehicle with his or her limb when he or she operates the vehicle without using the first foot control pedal. The safety apparatus and the motor vehicle comprising the safety apparatus of the present invention readily achieve the ends and advantages mentioned as well as those apparent therein. While certain preferred embodiments of the invention have been illustrated and described for purposes of the present disclosure, numerous changes in the exact manner of design and use may be made by those skilled in the art, which changes are encompassed within the scope and spirit of the invention as defined by the appended claims.

What is claimed is:

1. In a motor vehicle having a first foot control pedal for controlling a first function of said vehicle and alternative control means for allowing a physically handicapped driver to control said first function of said vehicle without using said first foot control pedal, the improvement comprising safety apparatus for preventing said driver from unintentionally contacting said first foot control pedal with his or her lower limb when he or she controls said first function of said vehicle with said alternative control means, said apparatus comprising:
   a base member attached to the floorboard of said vehicle in front of said first foot control pedal thereof; and
   means for preventing substantial forward and lateral movement of said lower limb of said driver and thereby holding said lower limb of said driver away from said first foot control pedal.

2. The improvement of claim 1 wherein said base member comprises a block having a lower surface, an upper surface and a side surface connecting said lower surface and said upper surface together, said side surface including a front portion facing away from said first foot control pedal.

3. The improvement of claim 2 wherein said means for holding said foot of said driver away from said first foot control pedal comprises said front surface.

4. The improvement of claim 3 wherein said front surface has a notch defined therein for receiving a portion of said lower limb of said driver.

5. The improvement of claim 1 wherein said base member comprises a first plate, said first plate having a lower surface, an upper surface and a side surface connecting said lower surface and said upper surface together.

6. The improvement of claim 5 wherein said means for preventing substantial forward and lateral movement of said lower limb of said driver and thereby holding said lower limb of said driver away from said foot control pedal comprises a second plate pivotally attached to said first plate and perpendicularly extending therefrom, said second plate having a lower surface, an upper surface and a side surface connecting said lower surface and said upper surface together, said second plate being movable toward said first plate such that said lower surface of said second plate faces said upper surfaces of said first plate.

7. The improvement of claim 6 wherein said side surface of said second plate comprises a rear surface, a first end surface, a second end surface and a front surface, said front surface having a notch defined therein for receiving a portion of said lower limb of said driver.

8. The improvement of claim 1 wherein said base member comprises a center member, and said means for holding said lower limb of said driver away from said first foot control pedal comprises two flexible end members attached to said center member and extending outwardly therefrom and means for attaching said end members together.

9. A motor vehicle, comprising:
   a first foot control pedal for controlling a first function of said vehicle;
   alternative control means for allowing a physically handicapped driver to control said first function of said vehicle without using said first foot control pedal; and
   safety apparatus for preventing said driver from unintentionally contacting said first foot control pedal with his or her lower limb when he or she controls said first function of said vehicle with said alternative control means, said apparatus comprising:
- a base member attached to the floorboard of said vehicle in front of said first foot control pedal thereof; and
- means attached to said base member for preventing substantial forward and lateral movement of said lower limb of said driver and thereby holding said lower limb of said driver away from said first foot control pedal.

10. The apparatus of claim 9 wherein said base member comprises a block having a lower surface, an upper surface and a side surface connecting said lower surface and said upper surface together, said side surface including a front portion facing away from said first foot control pedal.

11. The apparatus of claim 10 wherein said means for holding said lower limb of said driver away from said first foot control pedal comprises said front surface.

12. The apparatus of claim 11 wherein said front surface has a notch defined therein for receiving a portion of said lower limb of said driver.

13. The apparatus of claim 9 wherein said base member comprises a first plate, said first plate having a lower surface, an upper surface and a side surface connecting said lower surface and said upper surface together.

14. The apparatus of claim 13 wherein said means for preventing substantial forward and lateral movement of said lower limb of said driver and thereby holding said lower limb of said driver away from said foot control pedal comprises a second plate pivotally attached to said first plate and perpendicularly extending therefrom, said second plate having a lower surface, an upper surface and a side surface connecting said lower surface and said upper surface together, said second plate being movable toward said first plate such that said lower surface of said second plate faces said upper surface of said first plate.

15. The apparatus of claim 14 wherein said side surface of said second plate comprises a rear surface, a first end surface, a second end surface and a front surface, said front surface having a notch defined therein for receiving a portion of said lower limb of said driver.

16. The apparatus of claim 9 wherein said base member comprises a center member, and said means for holding said lower limb of said driver away from said first foot control pedal comprises two flexible end members attached to said center member and extending upwardly therefrom and means for attaching said end members together.

17. Safety apparatus for preventing a physically handicapped driver of a motor vehicle from unintentionally contacting a first foot control pedal of said vehicle with his or her lower limb when he or she operates said vehicle without using said first foot control pedal, comprising:
- a first plate adapted to be attached to the floorboard of said vehicle adjacent said first foot control pedal thereof, said first plate having a lower surface, an upper surface and a side surface connecting said lower surface and said upper surface together; and
- a second plate pivotally attached to said first plate and perpendicularly extending therefrom for holding said lower limb of said driver away from said first foot control pedal, said second plate having a lower surface, an upper and a side surface connecting said lower surface and said upper surface together, said second plate being movable toward said first plate such that said lower surface of said second plate faces said upper surface of said first plate, said side surface of said second plate comprising a rear surface, a first end surface, a second end surface and a front surface, said front surface having a notch defined therein for receiving a portion of said lower limb of said driver.

* * * * *